Nov. 8, 1960 CHENG-CHIEH HWANG 2,959,018

THERMOELECTRIC HEATING AND COOLING APPARATUS

Filed May 11, 1959

*INVENTOR.*
CHENG-CHIEH HWANG

*BY* Herman Seid

ATTORNEY

United States Patent Office 2,959,018

Patented Nov. 8, 1960

2,959,018

THERMOELECTRIC HEATING AND COOLING APPARATUS

Cheng-Chieh Hwang, Syracuse, N.Y., assignor to Carrier Corporation, Syracuse, N.Y., a corporation of Delaware Filed May 11, 1959, Ser. No. 812,325

8 Claims. (Cl. 62—3)

Figures 1, 2:
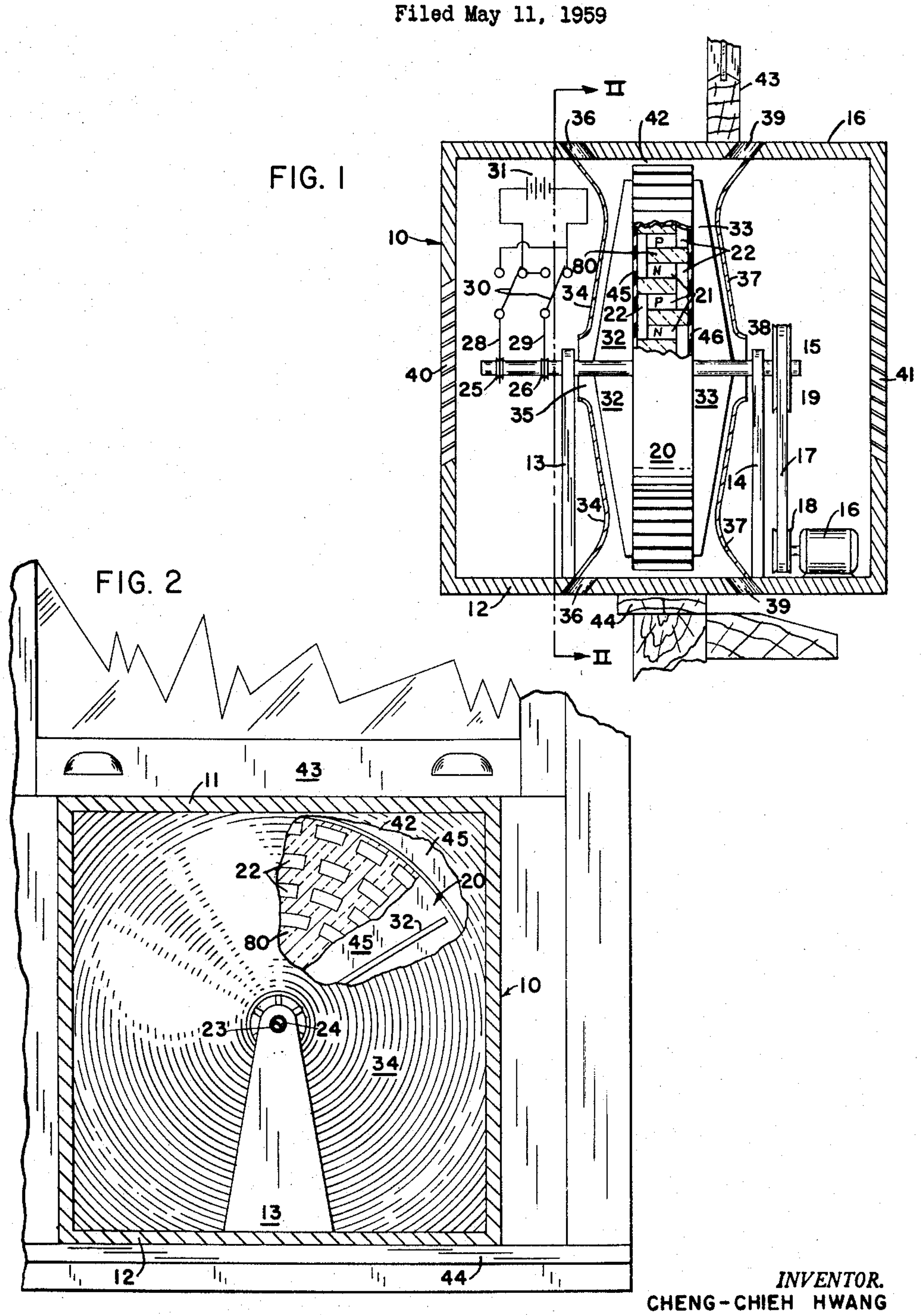

This invention relates to self-contained air conditioning units and more particularly to a self-contained air conditioning unit embodying thermoelectric apparatus for heating or cooling of air.

The principles underlying the production of hot and cold junctions by passing an electric current through semiconductor materials have been known for many years. However, the successful application of these principles to small self-contained air conditioning units has been thwarted by the difficulties encountered in the attempt to provide a simple structure without bulky and expensive heat transfer apparatus.

Accordingly, it is an object of this invention to provide a self-contained air conditioning unit embodying a simple and relatively inexpensive thermoelectric apparatus capable of heating or cooling air.

It is a further object of this invention to provide a self-contained air conditioning unit including heat transfer apparatus in conjunction with a panel of thermoelectric elements which is simple in design, inexpensive to manufacture and at the same time provides efficient heat transfer. These and other objects of my invention will be apparent to those skilled in the art by reference to the following description and attached drawings.

The self-contained air conditioning unit of the instant invention includes a rotatable thermoelectric panel having heat transfer fins secured thereto. The heat transfer fins act as fan blades to force surrounding fluid into contact with the blades and the thermoelectric panel, providing efficient heat transfer and also serve to discharge the fluid from the unit for heating or cooling at a desired remote point.

Figure 1 is a cross-sectional view of the improved self-contained air conditioning unit showing a portion of the thermoelectric panel broken away; and Figure 2 is a sectional view of the improved unit taken on line II—II on Figure 1 with portions broken away to show the fan blades and the thermoelectric elements.

Figure 1 shows a self-contained air conditioning unit such as a room cooler employing the thermoelectric apparatus and heat exchange means of the instant invention. The air conditioner has a casing 10 which is shown to be supported between window stool 44 and window sash 43. Casing 10 has a top plate 11 which may be secured and sealed to window 43 by any convenient means (not shown) such as a sponge rubber gasket. Bottom plate 12 of casing 10 rests on window stool 44 and supports standards 13 and 14. Journaled in standards 13 and 14 is an axle 15 driven by motor 16 through belt 17 disposed between pulley 19 secured to axle 15 and pulley 18 secured to the shaft of motor 16.

A circular disk-like thermoelectric panel 20 is secured to axle 15 and comprises a plurality of dissimilar thermoelectric elements 21 electrically connected by a plurality of jumpers 22 at alternating ends of the thermoelectric elements and a pair of sheets of electrical insulation 45 and 46. Each jumper 22 electrically connects one P-type thermoelectric element and one N-type thermoelectric element in series fashion. As will be understood by those skilled in the art, by connecting thermoelectric elements 21 of panel 20 in series so that they alternate between P-type elements and N-type elements and by placing the N-P connections of the series on one side of the panel and the P-N connections on the other side for a given direction of current flow, the application of a D.C. voltage to the thermoelectric elements will produce hot junctions on one side of the thermoelectric panel assembly 20, proximate electrical insulation sheet 46 for example, and cold junctions on the other side of the thermoelectric panel assembly, proximate electrical insulation sheet 45 for example. Whether a particular side of the panel is hot or cold will be determined by the polarity of the applied voltage. The thermoelectric elements 21 may be arranged in any convenient manner in the panel such as in concentric rings as shown in the drawing. Suitable thermal and electrical insulating material such as a plastic foam 80 may surround the thermoelectric elements.

Current is supplied to the thermoelectric elements of panel assembly 20 from a suitable power supply 31 through brushes 28 and 29 contacting slip-rings 25 and 26 mounted on axle 15 to which are attached wires 23 and 24 running through the axle and attached to the thermoelectric elements in the panel. The thermoelectric elements may be arranged within the panel in any desired configuration such as in concentric rings or in rows and columns and any group of elements may be connected in series of parallel depending on the supply voltage to provide efficient operation of the panel. A reversing switch 30 is shown between the power supply 31 and brushes 28 and 29 to enable selection of the desired polarity of current to the thermoelectric elements 21.

Fan blades 32 and 33 form an integral part of the thermoelectric panel assembly 20 and may be attached to insulation sheets 45 and 46 and to axle 15 if desired so as to rotate with the panel assembly. As shown in Figure 1, a plurality of first fan blades 32 which may be on the interior or room side of window 43 are positioned within first fan housing 34 which is supported by the casing 10 of the air conditioner. First fan housing 34 is formed with air inlet 35 about axle 15 and casing 10. A plurality of first air outlets 36 are provided in casing 10 for the discharge of air taken in by fan blades 32 through first air inlet 35. On the other side of the thermoelectric panel 20 which is shown on the outside of window 43, are disposed a plurality of second fan blades 33 supported for rotation with the thermoelectric panel and disposed in a second fan housing 37 with second fluid inlet means 38 and a plurality of second fluid outlet means 39 formed in casing 10.

Casing 10 has louvers formiing a room inlet 40 for the passage of air from the room into air inlet 35 of the fan. A suitable filter (not shown) may be interposed in the path of the air inlet. Inlet louvers 41 are provided in casing 10 for the entrance of outside air into fluid inset 38.

A small clearance space 42 is left between the thermoelectric panel 20 and casing 10 to permit rotation of the panel but at the same time effectively preventing the flow of any substantial amount of air from one side of the casing to the other. A fluid seal (not shown) may be provided in the clearance 42. Partition segments 45 serve to maintain the clearance 42 around the circumference of the thermoelectric panel 20 dividing the casing into two substantially noncommunicating compartments.

In operation D.C. voltage is supplied to the thermoelectric elements from power supply 31. If it is desired to cool the air discharged through air outlets 36 the proper polarity is selected for the current supplied to the panel by positioning of the switch 30 so that the cold junctions of the thermoelectric panels are proximate electrical insulation sheet 45 proximate the room side of the apparatus. Motor 16 is connected to a source of power and started and caused to rotate the thermoelectric panel assembly 20 including inside fan blades 32. Fan blades 32 then draw air from the room through louvers 40 in casing 10 into air inlet 35 where the air passes in heat exchange relation with the cold side of the thermoelectric panel. Fan blades 32 also serve the purpose of fins providing an extended area for heat transfer to the cold side of the thermoelectric panel 20. The air having given up a portion of its heat to the cold junctions of the thermoelectric elements is cooled and discharged through air outlets 36 into the room by the action of fan blades 32.

In order for cooling to proceed with maximum efficiency, it is desirable to conduct the heat generated at the hot junctions to thermoelectric elements proximate insulation sheet 46 away from the thermoelectric panel. This is accomplished by fan blades 33 which draw air into the casing through fluid inlet louvers 41 into fluid inlet 38 and pass it in heat exchange relation with the hot side of the thermoelectric panel where the fan blades 33 also serve as fins providing an extended heat transfer surface. The warmed air is then discharged through fluid outlets 39 in casing 10.

If it is desired to heat the room air instead of cooling it, it is only necessary to reverse the polarity of the D.C. current supplied to the panel by means of reversing switch 30. The current will then flow through the thermoelectric elements in the reverse direction causing the thermoelectric junctions proximate insulation sheet 45 to become hot and the thermoelectric junctions proximate the insulation sheet 46 to become cold. Air from the room passing through inlet 40 passed in heat exchange relation with the thermoelectric panel and discharged through air outlets 36 will then be warmed.

It will be appreciated that this invention is applicable to the heating and cooling of fluids other than air and that when used as an air conditioner, fluids other than air may be circulated in heat exchange relation with the hot side of the thermoelectric panel 20 by making appropriate modifications in the structure of the apparatus.

While there has been described a preferred form of this invention, it will be appreciated that this invention may be otherwise embodied within the scope of the following claims.

I claim:

1. An air conditioning apparatus comprising a casing having an air inlet and an air outlet in communication with said inlet, a thermoelectric panel assembly mounted within said casing for rotation about an axis, said panel assembly comprising a plurality of thermoelectric elements electrically connected and arranged so as to provide a plurality of hot and cold junctions proximate opposite sides respectively of said panel upon the application of an electric current, said air inlet and outlet being located on one side of said panel, an air moving means for drawing air into said casing through said air inlet, passing the air in heat exchange relation with one side of said panel assembly and discharging the air from said casing through said air outlet, partition means confining the circulation of said air to said one side of said thermoelectric panel, and means to supply electric current to said panel.

2. An air conditioning apparatus as defined in claim 1 wherein said means to supply an electric current to said thermoelectric elements includes a reversing switch to select the polarity of said current thus providing heating or cooling of the air on a given side of said panel.

3. An air conditioning apparatus comprising a casing having an air inlet and an air outlet in communication with said inlet, a thermoelectric panel assembly mounted within said casing for rotation about an axis, said panel assembly comprising a plurality of thermoelectric elements electrically connected and arranged so as to provide a plurality of hot and cold junctions proximate opposite sides respectively of said panel upon the application of an electric current, said air inlet and outlet being located on one side of said panel, partition means to substantially prevent circulation of air from one side of said panel to the other, said panel assembly further comprising fan blades associated with said panel assembly and adapted to rotate therewith, said fan blades being positioned so that upon rotation thereof air is drawn into said casing through said air inlet, passed in heat exchange relation with one side of said panel assembly and discharged from said casing through said air outlet, means to supply electric current to said panel and means to rotate said panel to thereby heat or cool the air discharged through said outlet.

4. An air conditioning apparatus as defined in claim 3 including a second set of fan blades associated with the other side of said panel from that with which said first-named blades are associated, a second fluid inlet and a second fluid outlet in communication therewith both disposed in said casing on the other side of said panel from said air inlet and outlet, said second fan blades being adapted upon rotation of said panel to draw fluid into said casing through said second fluid inlet, pass the same in heat exchange relation with the said other side of said panel and discharge the fluid from said casing through said second fluid outlet.

5. An apparatus for electrical heating and cooling comprising a thermoelectric panel assembly mounted for rotation about an axis, said panel assembly comprising a plurality of P-type and N-type thermoelectric elements electrically connected in alternating series fashion and arranged so as to provide hot and cold junctions upon the application of an electric current, junctions of one type being located proximate one side of said panel and junctions of the other type being located proximate the other side of said panel to provide a hot side and a cold side on said panel and to thereby heat fluid on one side of said panel and to cool air on the other side of said panel, partition means substantially separating said air from said fluid, means adapted to supply an electric current of a predetermined polarity to said thermoelectric elements of said panel assembly, said panel assembly further comprising a plurality of fan blades associated with said other side of said panel and adapted to rotate therewith, said fan blades being positioned and adapted to pass air in heat exchange relation with the thermoelectric junctions proximate said other side of said panel upon rotation thereof and means to rotate said panel assembly to heat or cool said air by said heat exchange relationship with said junctions proximate said other side of said thermoelectric panel.

6. An apparatus for electrical heating and cooling as defined in claim 5 including a plurality of second fan blades associated with said one side of said thermoelectric panel assembly, said second fan blades being adapted to rotate with said panel and to pass a fluid medium on said one side of said panel assembly in heat exchange relation with said junctions proximate said one side of said panel.

7. An air conditioning apparatus comprising a casing, apertured partition means dividing said casing into two substantially noncommunicating chambers, a thermoelectric panel mounted for rotation within the aperture in said partition, said thermoelectric panel being generally circular in form and having a pair of sides, said thermoelectric panel comprising a plurality of thermoelectric elements electrically connected to provide hot junctions and cold junctions upon the passage of an electric current therethrough having a predetermined polarity means, to supply an electric current having a predetermined polarity to said thermoelectric elements, said hot junctions being adjacent one side of said panel and said cold junctions being adjacent the other side of said panel, air moving means secured to the sides of said thermoelectric panel, air inlet means and air outlet means in communication with one of said chambers, said air moving means being adapted to draw air into said casing through said inlet means, pass said air over one side of said thermoelectric panel in heat exchange with the adjacent thermoelectric junctions and discharge said air through said outlet means.

8. An air conditioning apparatus as defined in claim 7 including a second air inlet means and a second air outlet means in communication with the other of said chambers and second air moving means for drawing air into said other chamber through said second inlet means, passing said air over the other side of said thermoelectric panel in heat exchange relation with the adjacent thermoelectric junctions and discharging said air through said second air outlet means.

References Cited in the file of this patent

UNITED STATES PATENTS

| | | |
|---|---|---|
| 484,182 | Dewey | Oct. 11, 1892 |
| 664,776 | Porter | Dec. 25, 1900 |
| 2,111,750 | Carlson | Mar. 22, 1938 |

UNITED STATES PATENT OFFICE

CERTIFICATION OF CORRECTION

Patent No. 2,959,018 November 8, 1960

Cheng-Chieh Hwang

It is hereby certified that error appears in the above numbered patent requiring correction and that the said Letters Patent should read as corrected below.

Column 2, line 29, for "of" read -- or --; line 52, for "formiing" read -- forming --; lines 56 and 57, for "inset" read -- inlet --.

Signed and sealed this 25th day of July 1961.

(SEAL)
Attest:

ERNEST W. SWIDER
Attesting Officer

DAVID L. LADD
Commissioner of Patents